Nov. 26, 1957 N. B. NICHOLS ET AL 2,814,167
PRECISION DRILLING MACHINES
Filed Feb. 25, 1955 2 Sheets-Sheet 2

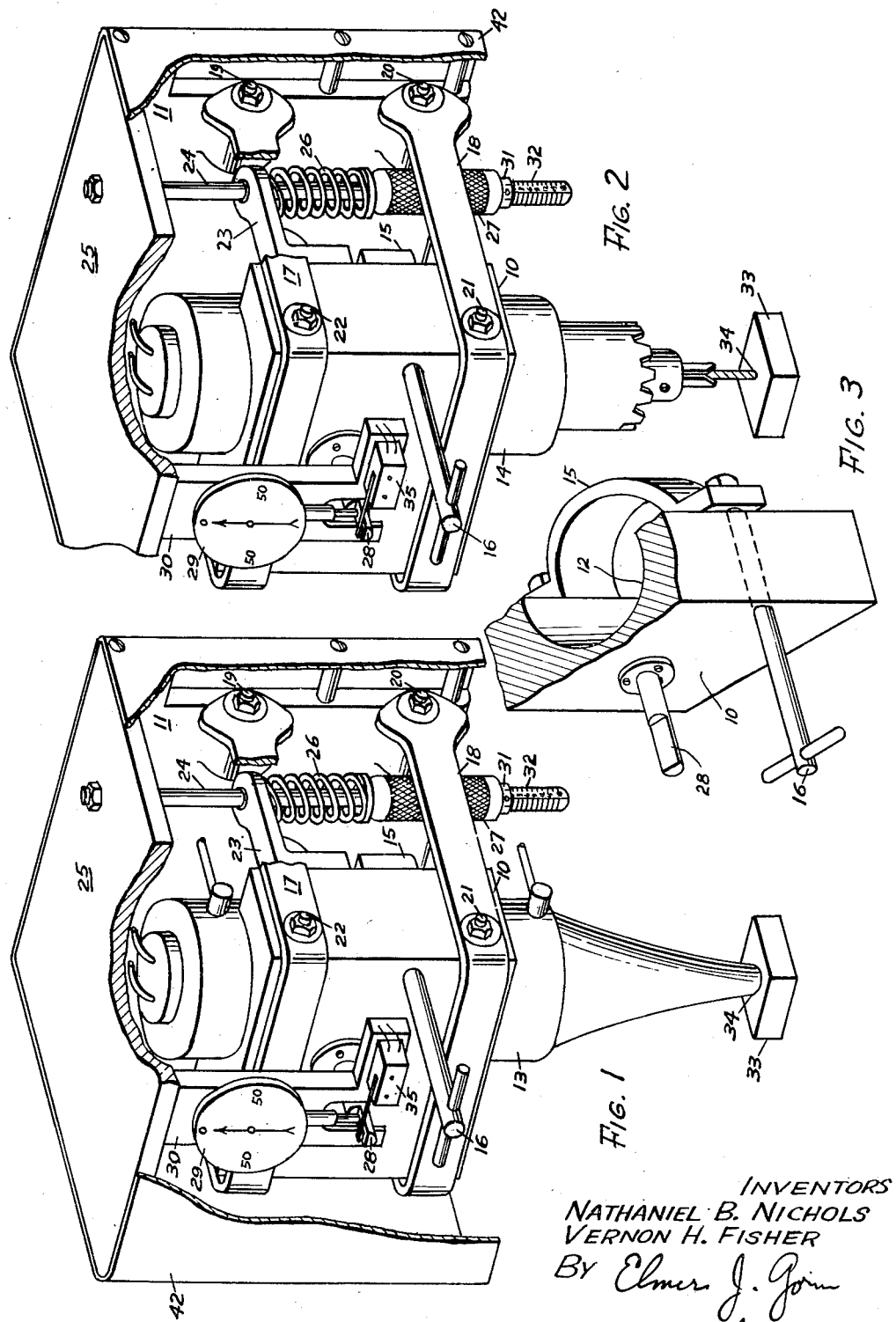

INVENTORS
NATHANIEL B. NICHOLS
VERNON H. FISHER
BY Elmer J. Gorn
ATTORNEY 2,814,167

Patented Nov. 26, 1957

2,814,167
PRECISION DRILLING MACHINES

Nathaniel B. Nichols, Newton Lower Falls, and Vernon H. Fisher, South Lincoln, Mass., assignors to Raytheon Manufacturing Company, Waltham, Mass., a corporation of Delaware Application February 25, 1955, Serial No. 490,584

9 Claims. (Cl. 51—59)

This invention relates to a precision drilling machine, and more particularly to a drilling machine wherein the controls for tool pressure are separate and independent from the controls for rate of feed.

In order to separate the adjustments of tool pressure from rate to feed, a first member, such as a drilling tool, is movably positioned with respect to a second member. A plurality of equal parallel arms are each pivotally connected to said first member at one end and said second member at the other end. External counterbalancing means, preferably in the form of a spring, is used both to support said first member and also maintain a right angle relationship between said parallel arms and a line running through said pivots on said first member. The load to be drilled is brought in contact with the drilling member, at which time an adjustment of the counterbalancing means will control the tool pressure between the drilling tool and the load, whereas feeding the load to be drilled into the drilling tool will determine the rate of feed. During the entire operation, the rate of feed of the load is such that a right angle relationship between said parallel arms and a line running through said pivots on said first member is maintained.

Further objects and advantages of this invention will be apparent as the description progresses, reference being made to the accompanying drawings wherein:

Fig. 1 is a view, partly broken away, of an embodiment of this invention utilizing an abrasive drilling tool;

Fig. 2 is a view, partly broken away, of an embodiment of this invention utilizing a rotary bit drilling tool;

Fig. 3 is a detail view, partly in section, of a clamping device used to secure the abrasive drilling tool and rotary bit drilling tool illustrated in Figs. 1 and 2.

Figure 4:
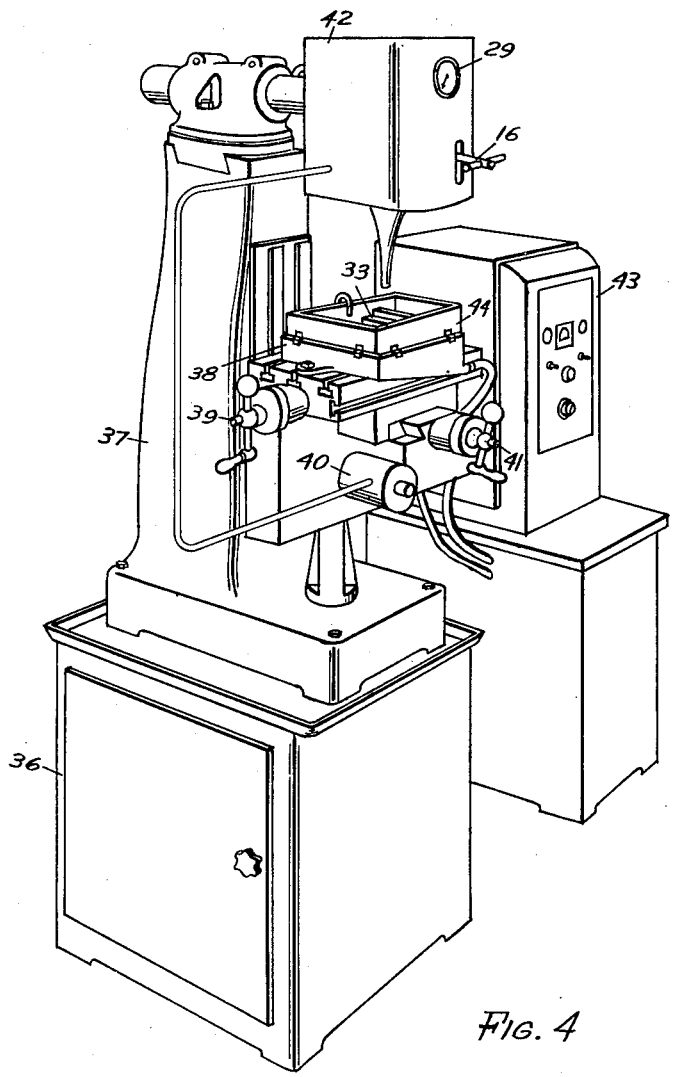
Fig. 4 is a view of an abrasive tool drilling machine utilizing an embodiment of this invention.

Referring now to Figs. 1, 2, and 3, there is shown a first member 10 movable with respect to a second fixed member 11. Said first member 10 is a clamp block having a suitable opening in one end, such as a semi-circular opening 12 for accepting a transducer 13 which is used in abrasive drilling, as shown in Fig. 1, or a rotary bit drilling tool 14, which is shown in Fig. 2. A clamping arm 15 fixedly connected at one end of clamp block 10 is movably opened or closed at the other end by means of clamp bolt 16, which is threaded into clamp block 10. Clamping arm 15 is used to fixedly position the drilling tool, such as transducer 13 or rotary bit drilling tool 14, tool clamp block 10. A plurality of equal parallel arms, such as arms 17 and 18, are each pivotally connected to stationary member 11, by means of ball bearing pivots 19 and 20, and to clamp block 10 by means of pivots 21 and 22. It will be observed that as long as arms 17 and 18 are parallel, the four pivotal points, 19, 20, 21 and 22, will define a parallelogram. In the preferred embodiment, arms 17 and 18 are each constructed in the form of a U, thereby giving clamp block 10 more rigidity in space by having four extra pivotal supports wherein two pivots are on clamp block 10, each opposite pivots 21 and 22, and two pivots are on stationary member 11 opposite pivots 19 and 20.

Since pivot points 19, 20, 21 and 22 define a parallelogram, and also since pivot points 19 and 20 are located on fixed member 11, it will be observed that clamp block 10 will always maintain a vertical position as it moves up and down through an arc. A spring bracket 23, shaped in the form of a right angle, is fixedly connected to clamp block 10 at one end and has a hole located in the other end through which a cylindrical rod 24 is free to pass. Cylindrical rod 24 is fixedly connected at one end to angle frame 25 which in turn is fixedly connected to fixed member 11. A calibrated spring 26 is inserted over cylindrical rod 24 and is caused to bear on spring bracket 23. The opposite side of cylindrical rod 24 is threaded, upon which an adjusting nut 27 is threaded until said adjusting nut 27 bears against the other side of calibrated spring 26. Adjusting nut 27 is threaded on cylindrical rod 24 until the compression on spring 26 exerts a force on clamp block 10, causing the parallel arms 17 and 18 to maintain a position such that a right angle relationship exists between said parallel arms and a line running through said pivots on said first member, which in the preferred embodiment will cause the parallel arms 17 and 18 to be horizontal. In the preferred embodiment, the position at which arms 17 and 18 are horizontal is obtained by having a stud 28 fixedly positioned to clamp block 10 operating upon a position indicator 29 which is a tool maker's dial gage having a range of 50-0-50 in thousandths of an inch that is fixedly positioned to an indicator bracket 30, which in turn is fixedly positioned to angle frame 25, which as mentioned previously is fixedly positioned to fixed member 11. The position indicator 29 is adjusted to read zero whenever arms 17 and 18 are horizontal. In the preferred embodiment, spring 26 has the same stiffness in pounds per inch deflection as the threads on cylindrical rod 24 have threads per inch, thereby making one revolution of adjusting nut 27 equal to one pound change in tool pressure. It is therefore possible at the time when arms 17 and 18 are horizontal, as indicated by a zero reading on position indicator 29, to adjust the graduated sleeve 31 to read zero against the fixed indications 32 located on the bottom portion of rod 24 by loosening set screws, not illustrated, located in adjusting nut 24 for holding said sleeve 31 with said nut 27. It will be observed that spring 26 is fully supporting the combined sprung weight, consisting of arms 17 and 18, clamp block 10, and transducer 13 as shown in Fig. 1, or rotary drill 14 as shown in Fig. 2. In actual operation the work 33 to be drilled is brought in contact with the tip of the drilling tool at point 34 at which time adjusting nut 27 is rotated until the desired force between the drilling tool and the work is read on graduated sleeve 31. If the drilling tool is now placed in operation a hole will be drilled in work 33 as the operator feeds work 33 against the drilling tool sufficient to maintain a zero indication on position indicator 29. In order to make the operation continuous and automatic, a switch 35, having its operating arm operated by stud 28, is mounted on indicator bracket 30. In the preferred embodiment, switch 35 is adjusted to close when position indicator 29 reads minus .050 and to open when position indicator 29 reads plus .050. The output of switch 35 is fed to an automatic work feeding control, thereby automatically feeding work 33 into the working tool as the drilling operation continues. It can be seen, therefore, that the rate of feed is dependent only upon the speed of feeding work 33 into the drilling tool, whereas adjusting nut 27 is used for controlling the tool pressure between said work and said cutting tool.

Referring now to Fig. 4, there is shown a table 36 supporting a machine base 37. Located on machine 37 is a movable bed 38 capable of moving in the X, Y, and Z direction by means of controls 39, 40 and 41, respectively. In the preferred embodiment, control 40 is actually an electric motor operated by means of switch 35, thereby providing an automatic means for feeding the load 33 into the drilling tool. To prevent dust and other accumulations from interfering with the head assembly, a cover 42 is used to completely surround and enclose all moving parts of said head assembly. An electron driver 43 is connected to transducer 13 for the purpose of supplying necessary vibrations unto said transducer. The work 33 is enclosed in a slurry tray 44 in which the abrasive material is pumped, thereby insuring a continuous supply of slurry between the cutting tool and the load.

It will be observed that even though clamp block 10 points in a vertical direction at all times, there is a rotation of pivot 22 about pivot 19 and also a rotation of pivot 21 about pivot 20. In fact, it is this rotation of pivots 22 and 21 about pivots 19 and 20 that maintain clamp block 10 in the same vertical direction. A result of this rotation of pivots 21 and 22 is that as pivots 21 and 22 rotate, clamp block 10 is brought closer to fixed member 11. The new distance is equal to the cosine of the angle of the arc through which the pivot points pass. This defect is eliminated by limiting the arc transcended by the pivot points to very small angles. By so limiting the movement of clamp block 10, it is possible for the vertical movement of clamp block 10 to be a straight line, since for very small angles the cord of an arc is equal to the arc. The accuracy of the drilling tool can therefore be controlled between limits dictated only by the requirements of the work. In the preferred embodiment, the vertical distance drilled was limited to plus and minus .050 of an inch, which corresponds to an arc of approximately ±.57°.

This completes the description of the embodiment illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

What is claimed is:

1. In a system of the type wherein a cutting tool is movably positioned by a plurality of equal parallel arms, which parallel arms are pivotally connected to said cutting tool at one end and a reference member at the other end, and where an adjustable spring maintains said cutting tool in a substantially fixed relationship with said reference member, the method of cutting that comprises the steps of placing a work member in contact with said cutting tool so as not to disturb said defined relationship existing between the cutting tool and the reference member, then adjusting said spring until a predetermined force is urged against said work member, and then as said cutting tool operates upon said work member changing the relative position of said cutting tool and the support for said work member in such a manner that the defined relationship between said reference member and said cutting tool is maintained.

2. In a system of the type wherein a cutting tool is movably positioned by a plurality of equal parallel arms, which parallel arms are pivotally connected to said cutting tool at one end and a reference member at the other end, and where an adjustable spring maintains said cutting tool in a substantially fixed relationship with said reference member, the method of cutting that comprises the steps of placing a work member in contact with said cutting tool so as not to disturb said defined relationship existing between the cutting tool and the reference member, then adjusting said spring until a predetermined force is urged against said work member, and then as said cutting tool operates upon said work member moving said work member against said cutting tool in such a manner that the defined relationship between said reference member and said cutting tool is maintained.

3. In combination, a cutting tool operating upon a work member, means for maintaining a constant contact force between said cutting tool and said work member, which contact force is independent of the rate of feed between said cutting tool and said work member, and means responsive to the positional change in said cutting tool caused by the actual rate of cutting for controlling the rate of feed between said work member and said cutting tool.

4. In combination, a cutting tool movably positioned by a plurality of equal parallel arms, which parallel arms are pivotally connected to said cutting tool at one end and a reference member at the other end, means connected intermediate said reference member and said cutting tool for maintaining said cutting tool in a substantially fixed relationship with said reference member, a work member operated upon by said cutting tool, and means responsive to the change in said defined fixed relationship caused by the rate of cutting of said cutting tool upon said work member for maintaining said cutting tool in said substantially fixed relationship with said supporting member.

5. In combination, a cutting tool movably positioned by a plurality of equal parallel arms, which parallel arms are pivotally connected to said cutting tool at one end and a reference member at the other end, means connected intermediate said reference member and said cutting tool for maintaining said cutting tool in a substantially fixed relationship with said reference member, a work member operated upon by said cutting tool, and means responsive to the change in said substantially fixed relationship between said cutting tool and said reference member for controlling the rate of feed between said work member and said cutting tool.

6. In combination, a cutting tool movably positioned by a plurality of equal parallel arms, which parallel arms are pivotally connected to said cutting tool at one end and a reference member at the other end, means connected intermediate said reference member and said cutting tool for maintaining said cutting tool in a substantially fixed relationship with said reference member, a work member operated upon by said cutting tool, means for maintaining a constant contact force between said work member and said cutting tool, and means responsive to the change in said defined fixed relationship caused by the rate of cutting of said cutting tool upon said work member for maintaining said cutting tool in said substantially fixed relationship with said supporting member.

7. In combination, an abrasive drilling tool movably positioned by a plurality of equal parallel arms, which parallel arms are pivotally connected to said abrasive drilling tool at one end and a reference member at the other end, means connected intermediate said reference member and said abrasive drilling tool for maintaining said abrasive drilling tool in a substantially fixed relationship with said reference member, a work member operated upon by said abrasive drilling tool, and means responsive to the change in said defined fixed relationship caused by the rate of cutting of said abrasive drilling tool upon said work member for maintaining said abrasive drilling tool in said substantially fixed relationship with said supporting member.

8. In combination, a cutting tool movably positioned by a plurality of equal parallel arms, which parallel arms are pivotally connected to said cutting tool at one end and a reference member at the other end, an adjustable spring connected intermediate said reference member and said cutting tool for maintaining said cutting tool in a substantially fixed relationship with said reference member, a work member operated upon by said cutting tool, and means responsive to the change in said defined fixed relationship caused by the rate of cutting of said cutting tool upon said work member for maintaining said cutting tool in said substantially fixed relationship with said supporting member.

9. In combination, a cutting tool movably positioned by a plurality of equal parallel arms, which parallel arms are pivotally connected to said cutting tool at one end and a reference member at the other end, means connected intermediate said reference member and said cutting tool for maintaining a right angle between said parallel arms and a line running through said pivots on said cutting tool, a work member operated upon by said cutting tool, and means responsive to the change in said defined fixed relationship caused by the rate of cutting of said cutting tool upon said work member for maintaining said cutting tool in said substantially defined relationship.

References Cited in the file of this patent
UNITED STATES PATENTS

| | | |
|---|---|---|
| 1,449,908 | Guckin et al. | Mar. 27, 1923 |
| 1,705,918 | Harrington | Mar. 19, 1929 |
| 1,871,992 | Heuze | Aug. 16, 1932 |
| 2,285,808 | Cumming | June 9, 1942 |
| 2,324,374 | Eden | July 13, 1943 |